United States Patent
Krammer (10) Patent No.: US 9,533,587 B2
(45) Date of Patent: Jan. 3, 2017

(54) DEVICE FOR ESTABLISHING AND DISCONNECTING A CHARGING CONNECTION FOR A PLUG-IN VEHICLE IN AN AUTOMATED MANNER

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 325 days.

(21) Appl. No.: 14/194,218

(22) Filed: Feb. 28, 2014

(65) Prior Publication Data

US 2014/0176070 A1     Jun. 26, 2014

Related U.S. Application Data

(63) Continuation of application No. PCT/EP2012/066845, filed on Aug. 30, 2012.

(30) Foreign Application Priority Data

Sep. 2, 2011   (DE) .......................... 10 2011 082 092

(51) Int. Cl.
*H02J 7/00* (2006.01)
*B60L 11/18* (2006.01)
*H01R 13/631* (2006.01)

(52) U.S. Cl.
CPC ........ *B60L 11/1818* (2013.01); *B60L 11/1827* (2013.01); *B60L 11/1833* (2013.01);
(Continued)

(58) Field of Classification Search
USPC .......................................................... 320/109
See application file for complete search history.

(56) References Cited

U.S. PATENT DOCUMENTS 6,157,162 A * 12/2000 Hayashi .............. B60L 11/1818
                                                    320/104
6,558,177 B2   5/2003 Havener et al.
(Continued)

FOREIGN PATENT DOCUMENTS

CA    1 238 960 A       7/1988
DE    31 51 560 A1      9/1983
(Continued)

OTHER PUBLICATIONS

International Preliminary Report on Patentability (PCT/IB/326) and (PCT/IB/373) dated Mar. 13, 2014, including Written Opinion (PCT/ISA/237) (ten (10) pages).
(Continued)

*Primary Examiner* — Robert Grant
(74) *Attorney, Agent, or Firm* — Crowell & Moring LLP (57) ABSTRACT

Charging device for the automatic establishment and disconnection of a charging connection for a plug-in vehicle, whereby the charging device of the plug-in vehicle includes a charging electrical unit, a charging station with a charging cable to charge an energy storage unit of the vehicle through a cable-based charging connection. The charging electrical unit comprises a socket and the charging cable a plug. The charging device is designed such that that the socket has one or more insertion funnels, the plug has one or more guide pins, wherein each guide pin is allocated to a specific funnel. Information is exchangeable between the charging station and the charging electrical unit once the charging connection is established. Information between the charging station and the vehicle is exchangeable if the charging connection is not established. The plug and a reinforced section on the charging cable connected to the plug are movable via a guide mechanism in a predefined spatial direction in the form of a coupling movement over maximum predefined coupling length. The plug and reinforced section are also movable opposite the predefined spatial direction in a decoupling movement over the coupling length.

18 Claims, 6 Drawing Sheets

(52) U.S. Cl.
CPC ...... *B60L 11/1838* (2013.01); *H01R 13/6315* (2013.01); *H02J 7/00* (2013.01); *H02J 7/0042* (2013.01); *B60L 2200/26* (2013.01); *B60L 2230/12* (2013.01); *B60L 2250/16* (2013.01); *H01R 2201/26* (2013.01); *H02J 2007/0096* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 7,999,506 B1 | 8/2011 | Hollar et al. |
| 8,636,527 B2 | 1/2014 | Hengel et al. |
| 2009/0189564 A1 | 7/2009 | Vasilantone |
| 2010/0277127 A1* | 11/2010 | Flack ............... B60L 11/1816 320/137 |
| 2011/0066515 A1 | 3/2011 | Horvath et al. |

FOREIGN PATENT DOCUMENTS

| | | |
|---|---|---|
| DE | 601 13 948 T2 | 7/2006 |
| DE | 20 2009 000 259 U1 | 4/2009 |
| DE | 10 2009 001 080 A1 | 8/2010 |
| DE | 10 2009 010 120 A1 | 9/2010 |
| DE | 10 2009 023 409 A1 | 12/2010 |
| EP | 2 393 165 A1 | 12/2011 |

OTHER PUBLICATIONS

German Search Report dated May 14, 2012 with partial English translation (nine (9) pages).
International Search Report dated May 15, 2013 with English translation (six (6) pages).

* cited by examiner

DEVICE FOR ESTABLISHING AND DISCONNECTING A CHARGING CONNECTION FOR A PLUG-IN VEHICLE IN AN AUTOMATED MANNER

CROSS REFERENCE TO RELATED APPLICATIONS

This application is a continuation of PCT International Application No. PCT/EP2012/066845, filed Aug. 30, 2012, which claims priority under 35 U.S.C. §119 from German Patent Application No. 10 2011 082 092.2, filed Sep. 2, 2011, the entire disclosures of which are herein expressly incorporated by reference.

BACKGROUND AND SUMMARY OF THE INVENTION

The invention relates to a charging device comprised of a plug-in vehicle a charging electrical unit, a charging station and a charging cable to charge an energy storage unit of the vehicle through the wired charging connection, whereby the charging electrical unit includes a socket and the charging cable includes a plug to establish and disconnect the charging connection.

Hybrid or electric vehicles have an electrical powertrain with an electrical energy storage unit. The electric energy storage unit, which is usually designed as a high-voltage battery, is typically discharged during the driving operation of the electrical vehicle in motor operation and charged in generator operation. In addition, there is often an option to charge the battery by way of an external charging source. In conductive, i.e. cable-based charging, the vehicle is connected with a charging source through a charging cable. The charging connection is mainly established through a plug-socket contact, whereby the socket is comprised of the charging electrical unit of the vehicle. The plug forms part of the charging cable, which in turn is connected or can be connected with the charging station. The operation by the user of the vehicle is similar to the procedure at a gas station, i.e. to initiate the charging process the user applies the plug in the same manner as the user would put a fuel nozzle into the tank opening. Therefore, disadvantages restricting the comfort for the user are connected therewith. There is the risk of soiling one's clothing on the charging cable when operating the cable. In addition, the establishment and disconnection of the charging connection takes time. Because in the current state of the art, a plug-in vehicle must be far more frequently charged after it reaches its range than a vehicle with a combustion motor has to be refueled, the repetitive similar action of establishing a charge connection is associated with inconvenience and a loss of comfort, which is not acceptable or reasonable for a plug-in vehicle or user interested in a premium class vehicle. The same process applies analogous to the disconnection of the charging connection.

In the current state of the art, the response to these disadvantages is, for example, to provide docking systems to make the establishment and disconnection of a charging connection more comfortable for the user through automation. For this purpose, e.g. according to DE 10 2009 023 409 A1, the movement of the vehicle is used to establish a connection between a docking module mounted on the vehicle and a charging module on the charging station. The user perceives that the charging connection is established automatically during parking at a certain parking position. This has the disadvantage that it requires a complex construction of the charging station because of the necessary charging module. By utilizing the movement of the vehicle, the docking module can be placed only at the rear or front of the vehicle. Any potential mounting spaces on the sides of the vehicle, in the underside, or in the roof can hardly be considered. In addition, the vehicle must be steered with "utmost precision" to the charging module.

It is the purpose of the invention to provide an improved device to establish and to disconnect a charging connection automatically in a plug-in vehicle.

This objective is solved by providing a charging device according to the invention. The charging device, which for a plug-in-vehicle is comprised of a charging electrical unit and a charging cable to charge an energy storage unit of the vehicle through a cable-based charging connection, whereby the charging electrical unit has a socket and the charging cable has a plug, is characterized in that it has among others one or more insertion funnels at the socket. Furthermore, the plug has one or more insertion pins, whereby each insertion pin is allocated to a specific insertion funnel. In addition, if the charging connection is established, information can be exchanged between the charging station and the charging electrical unit and, if the connection is not established, information can be exchanged between the charging station and the vehicle. Furthermore, the plug and a reinforcement or stiffened section of the charging cable connected to the plug through a guiding mechanism, of which the charging station is comprised, moves in a predefined spatial direction in the form of a coupling movement through a maximum predefined coupling length and in the opposite direction of the predefined spatial direction in the form of a decoupling movement over the same coupling length.

The user has thereby the special advantage that the coupling movement and decoupling movement can replace using the plug manually.

According to a preferred embodiment of the invention, the guiding mechanism is designed as guide arm that can be operated by an electric motor. This guide arm guides the plug together with the reinforced section.

Alternatively, the guiding mechanism is designed as cable roll operated by an electric motor so that the plug with the reinforced section can be guided tangentially to the cable roll while the cable roll is rotating.

The guide arm or the cable roll achieves the technical effect that the plug is movable while executing the coupling movement or decoupling movement. This can be used to move the plug toward the vehicle or away from the vehicle.

In addition, it is advantageous if the information exchanged between the vehicle and the charging station to establish a charging connection includes information as to the position of the vehicle and the vehicle takes a charging position to establish the charging connection. This charging position is relative to the charging station within a predefined charging position range. Once the vehicle enters this charging position range and takes the charging position, this embodiment will indicate it to the driver and it initiates a coupling movement upon taking the charging position.

This means that a charging connection can be established if the vehicle is in the charging position.

In the charging position, the spatial distance between plug and socket is less than the coupling length. In addition, the charging position range that represents all charging positions available is defined by the opening surface of the insertion funnel or in several insertion funnels by the opening surface of the insertion funnel with the smallest opening surface.

In other words, the insertion funnel on the vehicle is within reach of the coupling movement of the plug once the charging position has been taken.

The charging position range is characterized in that once a charging position has been taken and the coupling movement has been realized, each of the pins penetrates the opening surface of the insertion funnel allocated to this pin and it enters the insertion funnel.

In addition, the reinforced section can be embodied as mechanical stiffening of the charging cable; this stiffening can be calculated so that the charging cable is, in the stiffened section, able to withstand any bending due to the earth's gravity of the plug and charging cable but bendable when the force, which exceeds the gravity of the plug and charging cable, is applied.

This specific form of the charging cable's flexibility in the reinforced section provides the option of a controlled deflection or curvature in this area of the charging cable.

According to a further embodiment, the socket may include several insertion funnels. The charging connection is established once the charging position is taken and every pin engages through the coupling movement in a respective insertion funnel allocated to that pin. If the coupling movement is carried out, every insertion funnel moves the entering pin in a guiding motion, which includes a spatial direction complementary to the spatial direction of the coupling movement and that bends the charging cable in the reinforced section. The coupling movement and the guiding motion move the plug into the socket and therefore make contact between plug and socket. Once the plug-socket contact has been established, the coupling movement stops.

In other words, the coupling movement in connection with the wall of the insertion funnel exerts a bending moment onto the cable in the reinforced section so that the plug is specifically guided into the socket.

Alternatively, the reinforced section can be stiffened to a mechanically rigid charging rod and the socket can be rigidly connected to each insertion funnel. In this case, the socket is controllable in two spatial directions, whereby these two spatial directions are complementary to the spatial directions, which describes the movement caused by the guiding mechanism of the charging station.

If the charging cable is reinforced so as to be a charging rod and the socket comprises several insertion funnels, then every pin engages through coupling movement in the insertion funnel allocated to that pin to establish the charging connection once the charging position is assumed. In the embodiment of the coupling movement, each pin that has entered the insertion funnel exerts a guiding motion onto the insertion funnel, which steers the controllable socket in the direction of the plug. The coupling movement and the guiding motion move the plug into the socket and therefore make contact between plug and socket. Once the plug-socket contact has been established, the coupling movement stops.

The special advantage of this embodiment is that the socket is controlled during the coupling movement from the guiding rod in a manner so that the plug is moved specifically into the direction of the plug.

Alternatively, the socket can have an insertion funnel that is designed rotationally symmetrical and positioned at neck of the funnel. Furthermore, the plug can have a pin and can be designed rotationally symmetrical. The plug can have a conical latch-like part, which works as pin.

The rotationally symmetric embodiment of the socket and plug ensures that only one funnel is sufficient to establish a dependable plug-socket connection.

In combination with the flexible charging cable in the reinforced section, to establish a charging connection, the plug latch enters into the funnel through coupling motion once the charging position is assumed. If the coupling movement is carried out, the insertion funnel moves the entering plug latch in a guiding motion, which includes a spatial direction complementary to the spatial direction of the coupling movement and that bends the charging cable in the reinforced section. The coupling movement and the guiding motion move the plug into the socket and therefore make contact between plug and socket. Once the plug-socket contact has been established, the coupling movement stops.

If a charging rod with a rotationally symmetrical plug, and a rotationally symmetric socket, are used, to establish the connection the plug latch enters the funnel through coupling motion once the charging position has been assumed. In the embodiment of the coupling movement, each plug latch that has entered the insertion funnel exerts a guiding motion onto the funnel, which steers the controllable socket in the direction of the plug. The coupling movement and the guiding motion move the plug into the socket and therefore make contact between plug and socket. Once the plug-socket contact has been established, the coupling movement stops.

Due to the rotational symmetry of the socket and plug, one insertion funnel and pin pair are sufficient to establish the intended contact. With regard to the joint rotational axis of the plug and socket, the plug and socket can assume any angular position. Since a non-rotationally symmetric socket and plug have to assume a specific angular position to establish contact, as described above, several insertion funnels and pins are used in this case so that the respective angular position is defined.

Once the plug and socket make contact, the charging connection is established and the energy storage unit is rechargeable. The information exchanged between the charging station and the vehicle, once the charging connection has been established, includes information about the electrical status of the energy storage unit, so that the decoupling motion can be initialized once the charging connection has been established and/or once the energy storage unit is fully recharged. When the decoupling motion is carried out, the plug-socket connection is disconnected.

This embodiment offers the advantage that the vehicle can be automatically disconnected from the external charging source regardless of the status of the recharging process or it is disconnected automatically once the energy storage unit is full. The user of the vehicle does not have to operate the charging device manually.

In addition, each insertion funnel has a cover, which can be opened to establish a charging connection and which can be closed, if the charging connection is not established. This ensures that the socket is secure particularly while driving.

The invention is based on the following considerations. For electric vehicles, the conductive, i.e. cable-based, charging process with a manually pluggable charging connection has been established as the state of the art. At the same time, many manufacturers are researching automatic inductive procedures. Automatic and partially automatic procedures for conductive systems are known from other technical fields. In this context, docking stations for laptops or charging devices for electric lawnmowers, are known.

However, plugging in a charging cable manually to a vehicle can be rather uncomfortable. For example, the user can get dirty from the cable. Inductive procedures require complex technology and therefore they are rather expensive and require a larger installation space and have an increased weight. Moreover, the inductive charging technology through magnetic fields is associated with high transfer losses. Automatic coupling systems from alternative applications such as railway technology and automation technology do not satisfy the demanding and safety-relevant requirements for use in automotive applications. For example, this concerns high-voltage safety and the robustness in view of numerous environmental influences. Specific requirements are created due to the necessity of excluding any risks to persons that may be caused by mishandling by untrained persons during operation.

As an improved measure, a device and procedure to connect the vehicle automatically to a charging device are provided. For this purpose, the vehicle is initially roughly positioned, whereby the rough positioning is given by the position of the underside of the vehicle compared to the components of the charging device. The bendable charging cable is moved toward the charging socket of the vehicle through linear motion. The end of the charging cable that points toward the vehicle has a charging plug and a defined flexural rigidity, for which reason it is also called an insertion rod. The charging socket of the vehicle has an insertion funnel. Alternatively, the insertion funnel and the charging plug are flexible or the charging cable is flexible after the insertion rod, so that the precise position of the charging plug at the target location, i.e. the charging socket, is enabled. The three spatial directions are covered through the linear motion and through the flexible position or flexibility of the cable. In addition, the plug and the socket are designed to be rotationally symmetrical, so that it even covers the degree of rotation freedom of the plug with regard to the socket. These procedures can be modified through numerous embodiments.

The advantage of the measure is that conventional components can be used. In particular with regard to the vehicle, this solution is not extensive and is of low weight, requires little space and is inexpensive. The electrical connection is based on the interface specified in the standards. If it is installed on the ground, it is beneficial that it offers protection from vandalism and weather in a connected condition.

Other objects, advantages and novel features of the present invention will become apparent from the following detailed description of one or more preferred embodiments when considered in conjunction with the accompanying drawings.

BRIEF DESCRIPTION OF THE DRAWINGS

Same reference numbers are used the drawings to describe identical characteristics or parts.

DETAILED DESCRIPTION OF THE DRAWINGS

Figure 1:
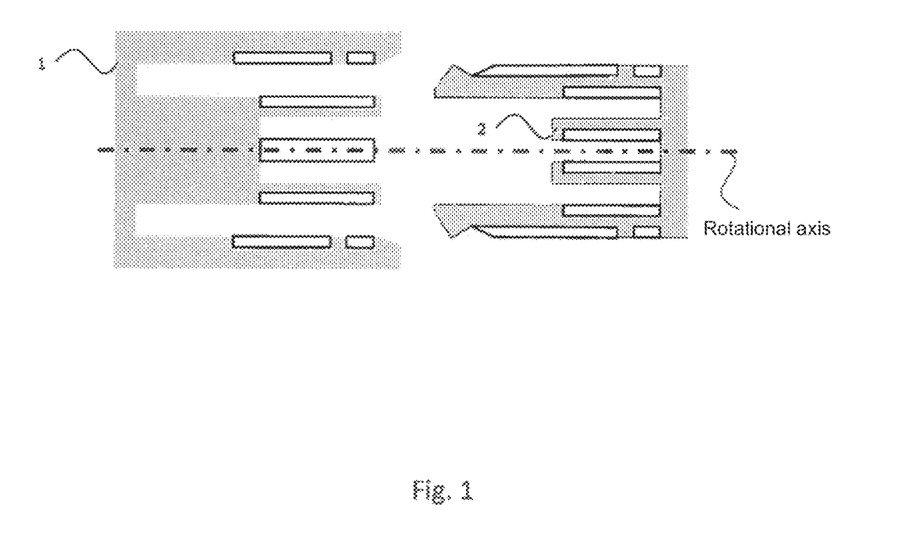
FIG. 1 is a schematic view of a rotationally symmetric socket and rotationally symmetric plug.

FIG. 1 shows a rotationally symmetric socket 1 and a rotationally symmetric plug 2 that establish a plug-socket connection to recharge the energy storage unit of a plug-in vehicle by way of an external power source. The rotational axis is shown as a dashed line. Specific contacts of the plug 2 are assigned to specific contacts on the socket; see bordered areas in FIG. 1. Just like in a plug and socket with a latch, the contacts are designed rotationally symmetrically. Without universal limitation, the contacts have control lines, a ground wire and phase lines. The control lines establish a communication between the vehicle or the charging electrical unit and the external power source. The plug 2 is conically shaped at the end facing the socket 1. The plug latch functions as pin through its conical shape.

Figure 2A:
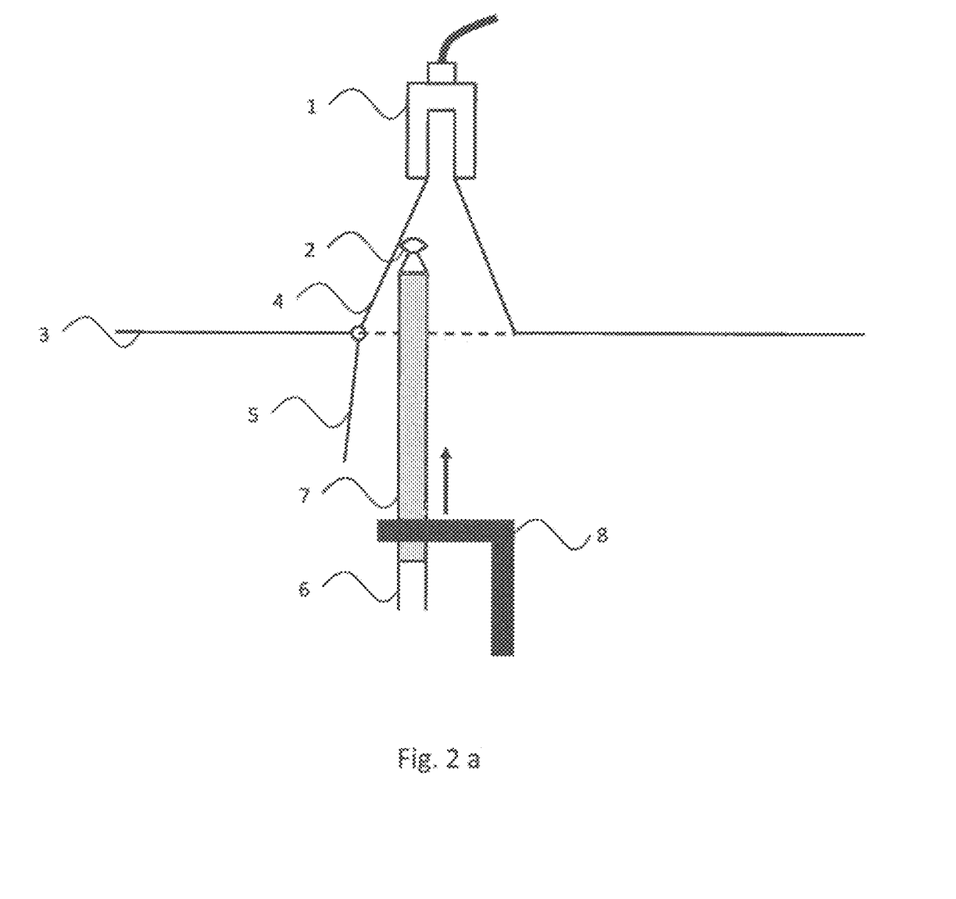
FIGS. 2a-2c illustrate the establishment of a charging connection with socket, plug and charging cable having a reinforced section.
Figure 2B:
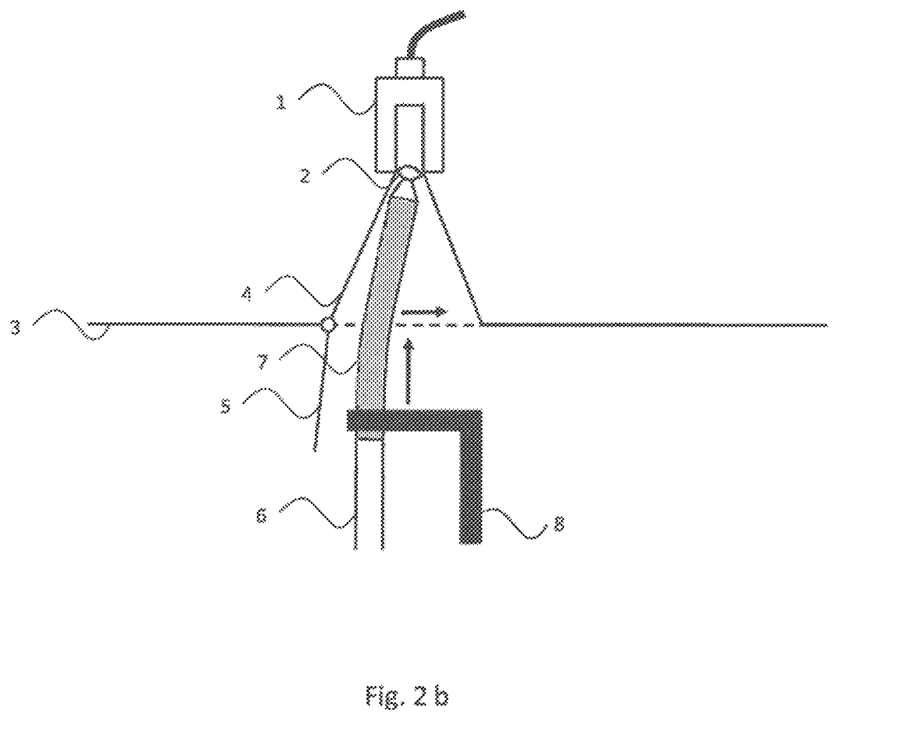
Figure 2C:
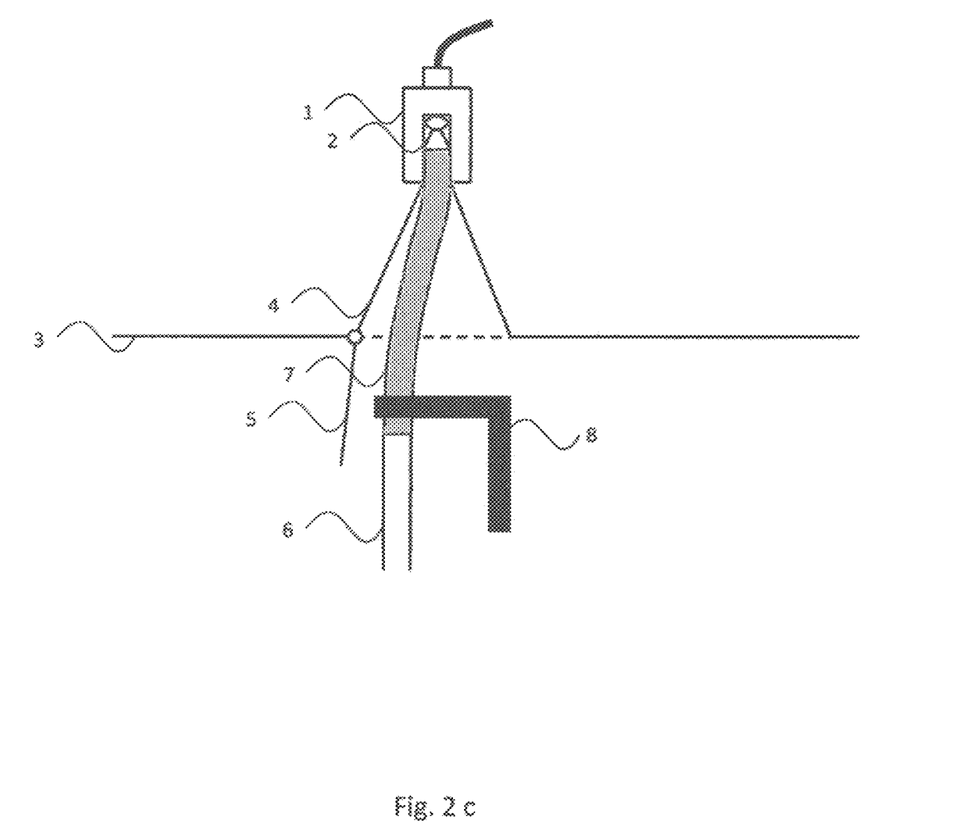

The conical design of the plug is shown in FIG. 2. The socket is part of the charging electrical unit of the plug-in vehicle. To establish a plug-socket connection, the plug is located at one end of the charging cable. Once the charging connection has been established, the charging cable is connected on the other end to an external power source. This can be a public DC charging station or a home AC charging box of the vehicle's user. Without universal limitation, a charging station is continuously assumed.

FIG. 2 shows an outer body of the vehicle 3. The socket 1 is fixedly installed at the neck of an insertion funnel 4, whereby the insertion funnel has opening surfaces at the opposite end of the socket. Because the opening surface represents a cutout of the outer body of the vehicle 3, this opening surface can has a cover 5. In this connection, this cover 5 is comparable to a fuel tank lid of a conventional vehicle having a combustion engine. This cover prevents the socket 1 and insertion funnel from soiling and can contribute to the vehicle's aesthetics. The aspect of the aesthetics of the cover is of lesser significance if the insertion funnel has been installed on the underside of the vehicle. The plug 2 is arranged at one end of the charging cable 6. A specific section of the charging cable 6 is reinforced at the end where the plug is located. In this reinforced section 7, the cable 6 can have a different, more stable, insulation material than in the remaining cable section.

As an option, the insulating material of the reinforced cable section can have a greater material thickness in the remaining cable section. Alternatively, the charging cable can have additional mechanical measures such as a sheath made of metal, in the reinforced section. In this context, the rigidity of the charging cable achieved through the stiffening in the reinforced section is characterized in that the charging cable does not bend under its own weight within the reinforced section. If, in addition to gravity, any force effects the cable at any point in the reinforced section, then the cable may bend in the area of the reinforced section.

FIG. 2(a) shows schematically a guide mechanism 8 of a charging station, which moves in a linear defined spatial motion. The flexural rigidity of the charging cable 6 under its own weight causes a guided motion of the plug 2, which moves in the same spatial direction. The movement of the guide mechanism 8 can be executed along a defined length, which is also termed as coupling length. The movement of the guide mechanism effected by the movement of the plug is called the coupling motion. A decoupling motion can be carried out through this guide mechanism. During the decoupling motion, the guide mechanism carries out a motion that is diametrically opposed to the coupling motion.

To establish an electric charging connection, i.e. to establish a plug-socket connection between the plug of the charging cable and the socket of the charging electrical unit, the vehicle must assume a rough, local position relative to the charging station. The position can be termed as "rough position" or "charging position". The vehicle has assumed a rough position, if the coupling motion leads to the plug penetrating the opening surface of the insertion funnel during the coupling motion and the conical pin enters the insertion funnel. The term "rough position" means that the vehicle need not be in an exact local position for the automatic establishment of the charging connection but it must be merely in an approximated position relative the charging station.

FIG. 2(a) shows schematically the pin that has entered the insertion funnel. The local position of any potential rough position is therefore determined by the opening surface of the insertion funnel and by the distance of the opening surface from the plug during the initial position of the plug or the coupling length.

FIG. 2(b) illustrates the effect the insertion funnel has during the coupling motion. The wall of the insertion funnel exerts a force onto the plug 2 during the coupling motion. This force is also called the guiding force and it is sufficient to flex the cable in the area of the reinforced section. This leads the plug uninterrupted from the coupling motion toward the socket, which is mounted at the neck of the insertion funnel.

During the further course of the coupling motion, plug and socket are connected as illustrated in FIG. 2(c). The control lines establish a bidirectional communication between the charging station and the charging electrical unit of the vehicle to transmit control parameters for recharging the battery.

Figure 3:
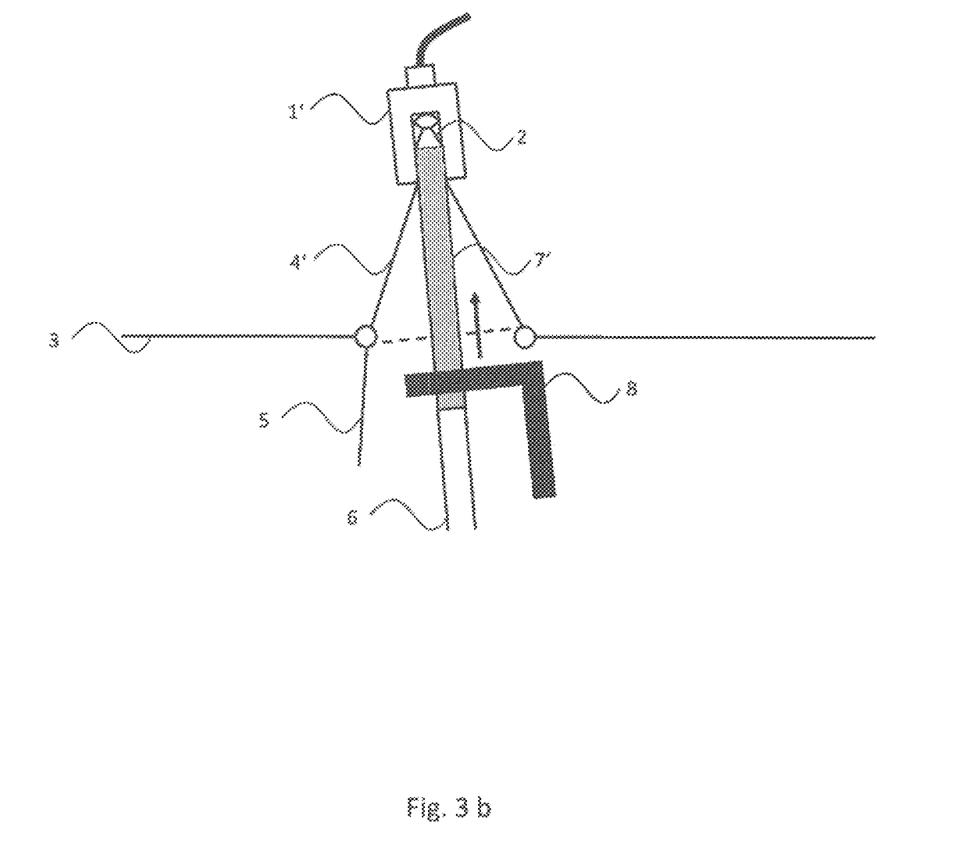
FIGS. 3a-3b illustrate the establishment of a charging connection with rotating socket, plug and charging rod.
Figure 3A:
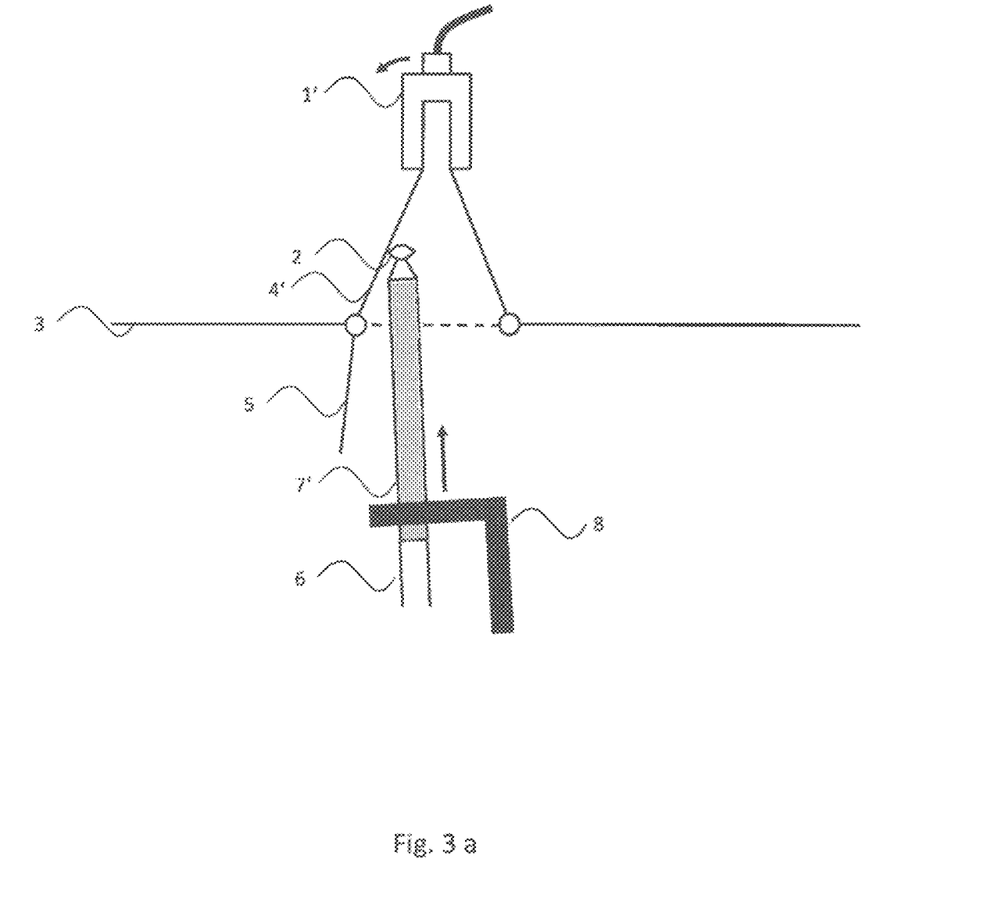

FIG. 3(a) shows another embodiment of the charging device. As opposed to the embodiment shown in FIGS. 2(a)-2(c), the charging cable here is reinforced into a charging rod in the area of the reinforced section 7'. The socket 1' and the insertion funnel are rigidly connected with one another and they are positioned flexibly 4'. The directions covered by the maneuverability of the socket 1 are identical to the spatial directions spanned by the outer body 3 of the vehicle.

In other words, the socket 1 can be controlled in accordance with spatial directions that are which are complementary to a perpendicular direction relative to the vehicle's outer body in the area of the insertion funnel. This allows maneuvering of the socket particularly in spatial directions once the vehicle has assumed an approximated position. These directions are complementary to the coupling motion of the charging rod. If the vehicle is in an approximated position, the plug enters the insertion funnel (see FIG. 3(a)) to establish a plug-socket connection once the coupling motion is carried out. If the plug and the wall of the insertion funnel are mechanically connected, the coupling motion generates in another embodiment a maneuverable guide force onto the insertion funnel and the socket through the charging rod. This is schematically illustrated by the bent arrow in FIG. 3(a). Through this coupling motion and the maneuverable guide force, the plug 2 is guided uninterrupted toward the socket 1.

In FIGS. 2 and 3, the socket and the plug are rotationally symmetrical. Therefore, the plug-socket connection to establish a charging connection is automatically achieved through the coupling motion and the guide forces. Compliance with a specific angular position of the plug relative to the socket with respect to the rotational axis is not required. If a conductive connection between the plug and socket is established, the communication between the charging station and the vehicle stops the coupling motion. The coupling length is another parameter for an approximated position, the vehicle has to assume, to establish a charging connection, because in this approximated position, distance between socket and plug may not exceed the coupling length.

According to another embodiment, the socket and insertion funnel are not designed to be rotationally symmetrical. In this case, the socket and the plug must assume a relative angular position in order to establish a charging connection. In this case, it is not a plug latch with the corresponding socket but, for example, a plug with several pins, to which specific contacts of the socket are allocated. If a rotationally asymmetric plug-socket combination is used, then the socket has at least two insertion funnels. A specific pin is allocated to each insertion funnel. The pins are located on the plug. An approximated position is achieved, once each pin enters into the insertion funnel to, which it is located, through the coupling motion. Therefore, the location of a potential approximated position is specified by the smallest opening surface in addition to the coupling length and the distance of the socket from the plug prior to the execution of the coupling motion by the insertion funnel.

The rough position of the vehicle, which is assumed in time before the execution of the coupling motion, can be carried out in various ways. For example, if the charging station is fixedly installed at one location, the driver can be guided to a parking position, which constitutes an approximated position in the above-referenced meaning, by structural measures such as sills or markings close to the ground. It is possible that a mechanical construction outside the vehicle or a self-drive assistant of the vehicle is used to move the vehicle without intervention of the driver in an approximated position. Alternatively, the driver will be supported by a driver assistance system and navigation instructions, which guide him into an approximated position. As soon as the vehicle has achieved a parking position, which constitutes an approximated position as described above, i.e. a charging connection can be established, then the charging station is initialized. For this purpose, there is at least a unidirectional communication from the vehicle to the charging station. This can be designed, for example, as a radio connection or as an infrared connection. In addition, an implementation based on RFID (radio frequency identification) is contemplated. From this initialized condition, the coupling motion can be executed to establish a charging connection and to recharge the vehicle. For this purpose, an acknowledgment by the driver may be required. The user perceives the establishment of the charging connection and the recharging of the vehicle as automatic. Even opening of the cover can be carried out automatically. At the end of the charging process, the plug-socket connection can be automatically disconnected by the guide mechanism. If the decoupling motion is executed upon fully recharging the battery or the charging process is terminated prematurely, then the plug is automatically disconnected from the socket and moved back into its initial position.

For the user, the recharging of the vehicle's battery is very comfortable. The charging process is automated to such a high degree, that the user is only participating directly in assuming an approximate position and perhaps in acknowledging a charging command.

According to FIGS. 2 and 3, the charging cable will be inserted in the area of the reinforced section by way of the guiding mechanism. The guide mechanism can be designed as movable electrically operated guide arm, which is attached to the external charging source or which is connected to this source. For example, a guide arm can be wall-mounted and integrated in a mailbox within the residential area.

Alternatively, the guide arm can be mounted on a free-standing charging station. According to another embodiment, the linear motion of the reinforced section can also be achieved through the rotation of a cable roll, whereby a tangential movement of the plug toward the roll is created, which can be supported by guide rails.

The device offers the special advantage that the socket can be located at any space on the outer body of the vehicle. For example, the socket can be installed on the underside or even on the roof of the vehicle. In addition, integration in the rear of the vehicle or the front of the vehicle or its sides is possible. Therefore, the most beneficial space for installation can be selected freely based on space and costs. In addition, the construction of the guide mechanisms can be coordinated with the preferred installation position of the socket.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for use with a plug-in vehicle having an energy storage device, comprising:
   a charging electrical unit of the plug-in vehicle, the charging electrical unit having a socket with one or more insertion funnels;
   a charging station having a charging cable and a guiding mechanism wherein
   the charging cable has a plug configured to mate with the socket to form a cable-based charging connection, the plug having one or more insertion pins and the charging cable having a reinforcement section defined such that the charging cable does not bend within the reinforcement section due to gravitational force affecting the plug and charging cable,
   each insertion pin of the plug is assigned to a specific insertion funnel,
   information is exchangeable between the charging station and the charging electrical unit when the cable-based charging connection is established,
   information is exchangeable between the charging station and the vehicle when the cable-based charging connection is not established,
   the plug and the reinforcement section of the charging cable are moveable via the guiding mechanism of the charging station in a specified spatial direction by way of a coupling movement over a maximum specified coupling length, and
   the plug and the reinforcement section of the charging cable are moveable via the guiding mechanism of the charging station in a spatial direction opposite the specified spatial direction in a decoupling movement over the coupling length.

2. The charging device according to claim 1, wherein
   the guiding mechanism is configured as a guiding arm operable via an electric motor, and
   the guiding arm guides the plug with the reinforcement section of the charging cable.

3. The charging device according to claim 1, wherein
   the guiding mechanism is configured as a cable reel, operable via an electric motor, and
   the plug is guidable with the reinforcement section of the charging cable tangentially to the cable reel when the cable reel rotates.

4. The charging device according to claim 1, wherein
   in order to establish the cable-based charging connection, information is exchanged between the vehicle and the charging station that includes an information item about a position of the vehicle,
   the vehicle can occupy a charging position in a charging position area that is specified in relation to the charging station and, in order to establish the cable-based charging connection, the vehicle occupies the charging position,
   entry of the vehicle into the charging position area and occupation of the charging position by the vehicle are indicated to a driver of the vehicle, and
   the occupation of the charging position initializes the coupling movement.

5. The charging device according to claim 4, wherein
   when the charging position is occupied, a spatial distance between the plug and the socket drops below the coupling length,
   the charging position area is determined by an opening area of the insertion funnel or, in a case of a plurality of insertion funnels, by an opening area of a respective insertion funnel having a smallest opening area, and
   when the charging position is occupied and the coupling movement executed, each insertion pin penetrates the opening area of an associated insertion funnel and enters into the associated insertion funnel.

6. The charging device according to claim 5, wherein
   the reinforcement section of the charging cable is a mechanically stiffened portion of the charging cable, and
   the mechanical stiffening is dimensioned such that when a force exceeding the gravitational force is applied, the charging cable is flexible in the reinforcement section.

7. The charging device according to claim 5, wherein
   the reinforcement section is stiffened to form a mechanically rigid charging rod,
   the socket is rigidly connected to each insertion funnel, and
   the socket is mounted so as to be deflectable in two spatial directions, which are oriented complementary to the spatial direction describing movement of the plug, wherein said plug movement is caused by the guiding mechanism of the charging station.

8. The charging device according to claim 6, wherein
   the socket has only one insertion funnel,
   the socket is rotationally symmetrical,
   the socket is located at a neck of the one insertion funnel,
   the plug has only one insertion pin,
   the plug is rotationally symmetrical,
   the plug has a conical, latch-like part as a plug latch, and
   the plug latch is the insertion pin.

9. The charging device according to claim 7, wherein
   the socket has only one insertion funnel,
   the socket is rotationally symmetrical,
   the socket is located at a neck of the one insertion funnel,
   the plug has only one insertion pin,
   the plug is rotationally symmetrical,
   the plug has a conical, latch-like part as a plug latch, and
   the plug latch is the insertion pin.

10. The charging device according to claim 6, wherein
    the socket has a plurality of insertion funnels,
    in order to establish the cable-charging connection in an event of an occupied charging position due to the coupling movement, each insertion pin enters into an associated insertion funnel,
    on executing the coupling movement, each insertion funnel guides the entering insertion pin in a guiding movement which comprises spatial directions complementary to the spatial of the coupling movement, and bends the charging cable in an area of the reinforcement section of the charging cable, the coupling movement and the guiding movement move the plug into the socket and make a plug and socket connection, and when the plug and socket connection is made, the coupling movement terminates.

11. The charging device according to claim 7, wherein
the socket has a plurality of insertion funnels,
in order to establish the cable-charging connection in an event of an occupied charging position due to the coupling movement, each insertion pin enters into an associated insertion funnel,
on executing the coupling movement, each insertion funnel guides the entering insertion pin in a guiding movement which comprises spatial directions complementary to the spatial of the coupling movement, and bends the charging cable in an area of the reinforcement section of the charging cable,
the coupling movement and the guiding movement move the plug into the socket and make a plug and socket connection, and
when the plug and socket connection is made, the coupling movement terminates.

12. The charging device according to claim 8, wherein
in order to establish the cable-charging connection in an event of an occupied charging position due to the coupling movement, the plug latch enters into the insertion funnel,
on executing the coupling movement, the insertion funnel guides the entering plug latch in a guiding movement which comprises spatial directions complementary to the spatial direction of the coupling movement, and bends the charging cable in an area of the reinforcement section,
the coupling movement and the guiding movement move the plug into the socket and make a plug and socket connection, and
when the plug and socket connection is made, the coupling movement terminates.

13. The charging device according to claim 9, wherein
in order to establish the cable-charging connection in an event of an occupied charging position due to the coupling movement, the plug latch enters into the insertion funnel,
on executing the coupling movement, the insertion funnel guides the entering plug latch in a guiding movement which comprises spatial directions complementary to the spatial direction of the coupling movement, and bends the charging cable in an area of the reinforcement section,
the coupling movement and the guiding movement move the plug into the socket and make a plug and socket connection, and
when the plug and socket connection is made, the coupling movement terminates.

14. The charging device according to claim 10, wherein
the charging connection is established when the plug and socket connection has been made,
the energy storage device is chargeable when the charging connection has been established,
information that is exchanged between the charging station and the vehicle when the charging connection has been established comprises data about an electrical state of the energy storage device,
the decoupling movement is initializable when the charging connection has been established and/or when the energy storage device is fully charged, and
the plug and socket connection can be broken upon executing the decoupling movement.

15. The charging device according to claim 11, wherein
the charging connection is established when the plug and socket connection has been made,
the energy storage device is chargeable when the charging connection has been established,
information that is exchanged between the charging station and the vehicle when the charging connection has been established comprises data about an electrical state of the energy storage device,
the decoupling movement is initializable when the charging connection has been established and/or when the energy storage device is fully charged, and
the plug and socket connection can be broken upon executing the decoupling movement.

16. The charging device according to claim 12, wherein
the charging connection is established when the plug and socket connection has been made,
the energy storage device is chargeable when the charging connection has been established,
information that is exchanged between the charging station and the vehicle when the charging connection has been established comprises data about an electrical state of the energy storage device,
the decoupling movement is initializable when the charging connection has been established and/or when the energy storage device is fully charged, and
the plug and socket connection can be broken upon executing the decoupling movement.

17. The charging device according to claim 13, wherein
the charging connection is established when the plug and socket connection has been made,
the energy storage device is chargeable when the charging connection has been established,
information that is exchanged between the charging station and the vehicle when the charging connection has been established comprises data about an electrical state of the energy storage device,
the decoupling movement is initializable when the charging connection has been established and/or when the energy storage device is fully charged, and
the plug and socket connection can be broken upon executing the decoupling movement.

18. The charging device according to claim 1, wherein each insertion funnel has a cover flap, the cover flap being openable in order to establish the charging connection and being closable when the charging connection has not been established.

* * * * *